(12) United States Patent
Bracciano

(10) Patent No.: US 7,096,925 B2
(45) Date of Patent: Aug. 29, 2006

(54) MODULAR ELECTRIC HVAC SYSTEMS FOR VEHICLES

(75) Inventor: Daniel Christopher Bracciano, Grosse Pointe Shores, MI (US)

(73) Assignee: General Motors Corporation, Detroit, MI (US)

( * ) Notice: Subject to any disclaimer, the term of this patent is extended or adjusted under 35 U.S.C. 154(b) by 358 days.

(21) Appl. No.: 10/464,933

(22) Filed: Jun. 19, 2003

(65) Prior Publication Data

US 2004/0256082 A1    Dec. 23, 2004

(51) Int. Cl.
*B60H 3/00* (2006.01)
*F28F 9/00* (2006.01)
*B60L 1/02* (2006.01)

(52) U.S. Cl. .......................... 165/42; 165/67; 62/3.61; 62/244; 180/68.4; 219/202

(58) Field of Classification Search ................. 165/41, 165/103, 202, 42, 43, 67; 62/3.61, 184, 244; 219/202, 270, 208; 180/68.4, 65.3
See application file for complete search history.

(56) References Cited

U.S. PATENT DOCUMENTS

| | | | | |
|---|---|---|---|---|
| 4,459,466 A | * | 7/1984 | Nakagawa et al. | 165/103 |
| 4,727,728 A | * | 3/1988 | Brown | 62/244 |
| 5,355,690 A | * | 10/1994 | Iritani et al. | 62/184 |
| 5,505,251 A | * | 4/1996 | Sarbach | 165/202 |
| 5,571,432 A | * | 11/1996 | Sarbach | 219/202 |
| 6,059,016 A | * | 5/2000 | Rafalovich et al. | 165/41 |
| 6,124,570 A | * | 9/2000 | Ebner et al. | 219/202 |
| 6,272,873 B1 | * | 8/2001 | Bass | 62/3.61 |
| 6,396,028 B1 | * | 5/2002 | Radmacher | 219/270 |
| 6,443,502 B1 | * | 9/2002 | Iida et al. | 285/351 |
| 6,634,870 B1 | * | 10/2003 | Dreiman et al. | 417/368 |
| 2005/0183421 A1 | * | 8/2005 | Vaynberg et al. | 60/641.8 |

* cited by examiner

*Primary Examiner*—Ljiljana Ciric
(74) *Attorney, Agent, or Firm*—Laura C. Hargitt

(57) ABSTRACT

Components for HVAC systems used in hybrid and fuel cell vehicles are mounted in modular configuration on a frame with air conditioning components connected to one another by metal pipes welded to the components. An alternating current motor, integral with a compressor, is driven by 310 volt alternating current from an inverter, which inverter converts 310 volt direct current that is used to power the vehicle. PTC heaters in fluid communication with an evaporator employed by the air condition system are directly energized by the 310 volt direct current. The modular system is mounted directly on the chassis of the vehicle, facilitative assembly of the vehicle, and is readily removable as a unit from the chassis for repair or replacement.

21 Claims, 10 Drawing Sheets

MODULAR ELECTRIC HVAC SYSTEMS FOR VEHICLES

The present invention relates to modular electric HVAC systems for vehicles, and more particularly, the present invention relates to modular electric HVAC systems suitable for hybrid or fuel cell vehicles.

BACKGROUND OF THE INVENTION

Hybrid vehicles that rely on both internal combustion engines and direct current motors for power, and fuel cell vehicles that rely on electric motors driven by current from fuel cells, both have passenger compartments that are ventilated, heated and air conditioned, and have windshield glass that is defrosted. Automotive vehicles powered by internal combustion engines generate heat by combustion that is used to heat passenger compartments and defrost windshields, and use mechanical power transmitted from the engine by belts to compressors that drive air conditioning systems. Hybrid vehicles normally use only electric motors when cruising, but rely on internal combustion engines for acceleration, heat and air conditioning. It is desirable with hybrid vehicles to minimize operation of internal combustion engines. Fuel cell vehicles have no internal combustion engines, consequently air conditioning and heating can only be provided by electric current. In view of these considerations there is a need for heating, ventilating and air conditioning (HVAC) systems for hybrid and fuel cell vehicles, which operate at high efficiency and consume minimal space.

SUMMARY OF THE INVENTION

Electric heating and air conditioning systems for vehicles have a reduced size and a modular configuration with the air conditioning systems having piping joining components with fixed joints and having compressors driven directly by electric motors.

An embodiment of the aforementioned system employs a frame for supporting an electric heating, ventilating and air conditioning (HVAC) system in a modular configuration. The modular configuration includes a hermetic compressor driven by an electric motor and mounted on the frame; a condenser mounted on the frame and connected to the compressor; a receiver on the frame and connected to the condenser, and an evaporator connected to the receiver through an expansion valve and mounted on the frame at a location displaced from the condenser. A PTC heater mounted on the frame is disposed in fluid communication with the evaporator and a blower, which blower is also in fluid communication with the evaporator and blows an air stream through both the evaporator and PTC heater. Vent, heat and air conditioning outlets mounted on the frame are disposed in fluid communication with the evaporator and the PTC heater for dispensing the air stream from the blower into the passenger compartment of the vehicle.

In a further aspect of the invention, pipes connect the components of the air conditioning system to one another with fixed couplings, preferably in the form of welds.

In still a further aspect of the invention, the system includes a condenser air intake duct, which is mounted on the frame above the condenser for directing outside air through to the condenser.

In still a further aspect of the invention, the condenser has fans associated therewith, wherein the fans are disposed within the frame for drawing outside air through the air intake duct and through the condenser.

In still another aspect of the invention, the modular system is in combination with a dash of the vehicle with the vent, heat and air conditioning outlets projecting through an opening in the dash.

In still a further aspect of the invention, the air inlet includes an outside air inlet and a recirculation air inlet, the recirculation air inlet being in fluid communication with the passenger compartment.

In an additional embodiment of the invention, an air conditioning inverter is mounted on the frame for converting 310-volt direct current to about 310-volt alternating current to provide alternating current to the motor that drives the compressor.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
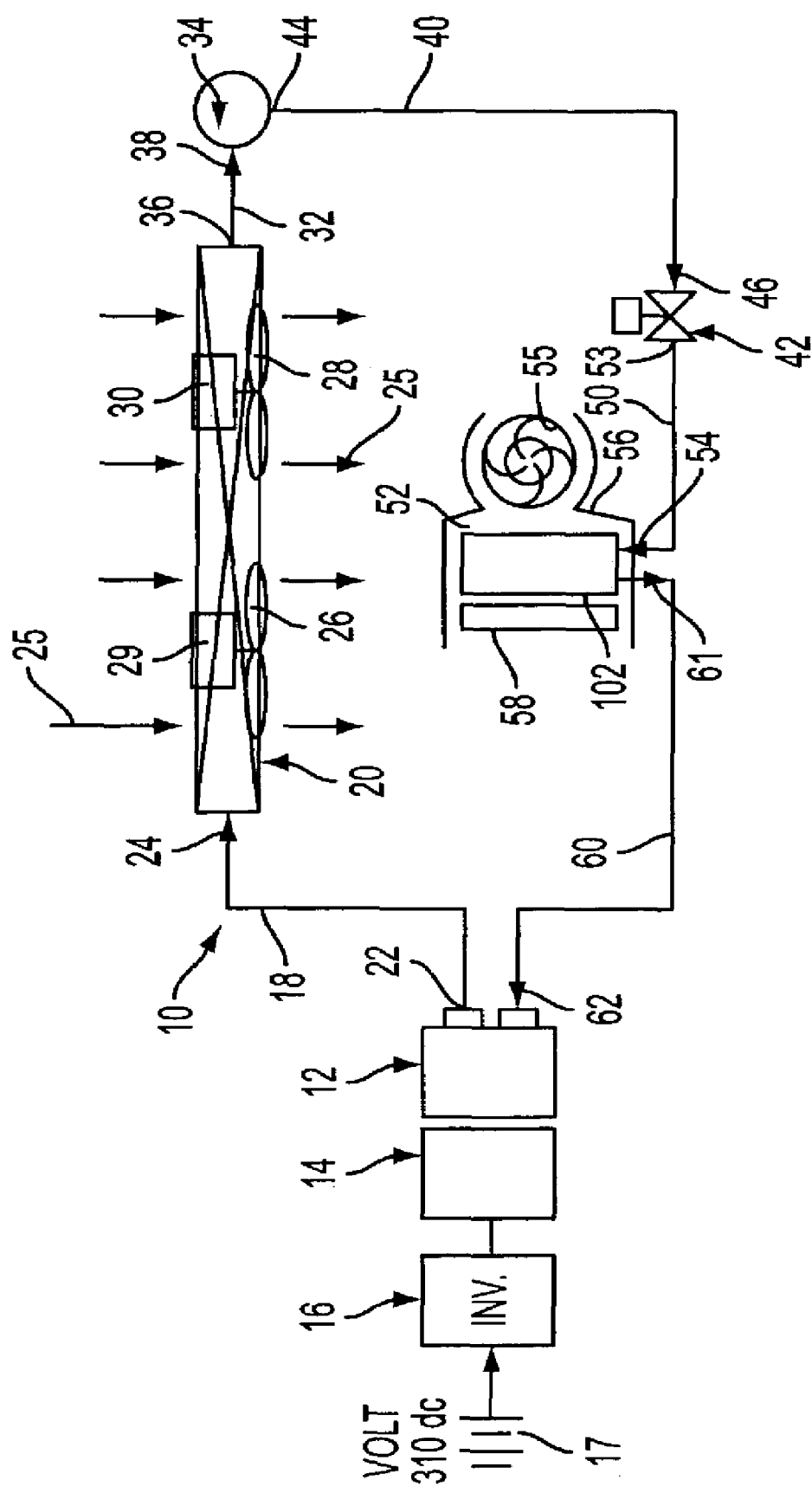
FIG. 1 is a schematic view illustrating components of a modular HVAC system connected to one another in accordance with the present invention.

Referring now to FIG. 1 there is shown schematically a modular heating, venting and air conditioning (HVAC) system 10 configured in accordance with the principles of the present invention. The system comprises air conditioning components including a hermetic compressor 12 driven by an electric motor 14 that is integral with the compressor. The hermetic compressor 12 is preferably a scroll-type compressor. The electric motor 14 is driven by a 310-volt alternating current input provided by an inverter 16 that converts 310-volt dc from a vehicle's batteries and/or fuel cell system 17 to 310 volts ac.

The hermetic compressor 12 is connected by a line 18 to a condenser 20. Preferably, the line 18 is metal pipe that has welded connections 22 and 24 to the hermetic compressor 12 and the condenser 20 in lieu of the hose connections usually employed by automotive vehicles. The condenser 20 has a pair of cooling fans 26 and 28 driven by motors 29 and 30, respectively, which fans draw outside air through the condenser. The condenser 20 receives compressed, hot refrigerant gas from the hermetic compressor 12 and condenses the gas to a liquid by exposing the gas to a coolant stream 25 of outside air provide by the fans 26 and 28. The condensed liquid refrigerant then flows through a line 32 to a receiver 34. Preferably, the line 32 is a metal pipe that is welded to the condenser 20 by a weld 36 and to the receiver 34 by a weld 38. The receiver 34 separates any gas received from the condenser 20 from liquid refrigerant and delivers the liquid refrigerant over a line 40 to a block-type expansion valve 42. Preferably, the line 40 is a metal pipe that is welded at the receiver by a weld 44 and to the expansion valve 42 by a weld 46. The expansion valve 42 delivers low-pressure refrigerant over a line 50 to an evaporator 52. The line 50 is preferably a metal tube that is welded at its end 53 to the expansion valve 42 and end 54 to the evaporator 52.

The evaporator 52 is a heat absorption component that is in fluid communication with the passenger compartment of the vehicle and receives either outside air or recirculated air from a motor driven blower 55 that is in fluid communication with the evaporator via a duct 56. The evaporator 52 includes a coil with aluminum fins (not shown), which coil receives the refrigerant entering the top of the evaporator. Low-pressure liquid refrigerant passing through the coil encounters the warm recirculating air from the passenger compartment, which causes the low-pressure liquid refrigerant to boil. The resulting phase change absorbs heat from the recirculating air, the heat then being carried off by the refrigerant over line 60 back to the hermetic compressor 12. The line 60 is preferably a metal pipe that is welded at weld 61 to the evaporator 52 and is welded at weld 62 to the hermetic compressor 12.

By connecting the air conditioning components comprised of the compressor 12, the condenser 20, the receiver 34, the expansion valve 42 and the evaporator 52 with metal pipes 18, 32, 40, 50 and 60 having welded connections, instead of by hoses, a tight hermetic system is provided which is both leak resistant and compact, thus improving reliability while minimizing the space in a vehicle consumed by HVAC requirements. This feature minimizes the possibility of refrigerant escaping to the atmosphere. Preferably, the metal pipes are made of copper or aluminum, or of alloys such as, but not limited to copper and aluminum alloys. While metal pipes are preferred, other materials having corrosion resistance and long life qualities may also be used.

In fluid communication with the evaporator 52 and the blower 55 and disposed in the duct 56, are positive temperature coefficient resistance heaters (PTC heaters) 58a and 58b that selectively heats air after the air has passed through the evaporator 52. While two PTC heaters are preferred, one PTC heater or more than two PTC heaters may be used.

The PTC heaters 58a and 58b are resistance heaters in which resistance decreases as temperature increases. The PTC heaters 58a and 58b utilize ceramic heating elements and self regulate at preset temperatures. When the evaporator 52 is operating in its air conditioning mode, the evaporator can remove moisture from cabin air as it is heated for circulation through the passenger compartment. If it is desired to only heat cabin air, the evaporator 52 is not operated, and if it is desired to provide only outside air, neither the heaters 58a and 58b, nor the air conditioning system are energized. When desired, the blower 55 operates in a vent mode to provide a fan adjustable breeze with slightly pressurized air.

Figure 2:
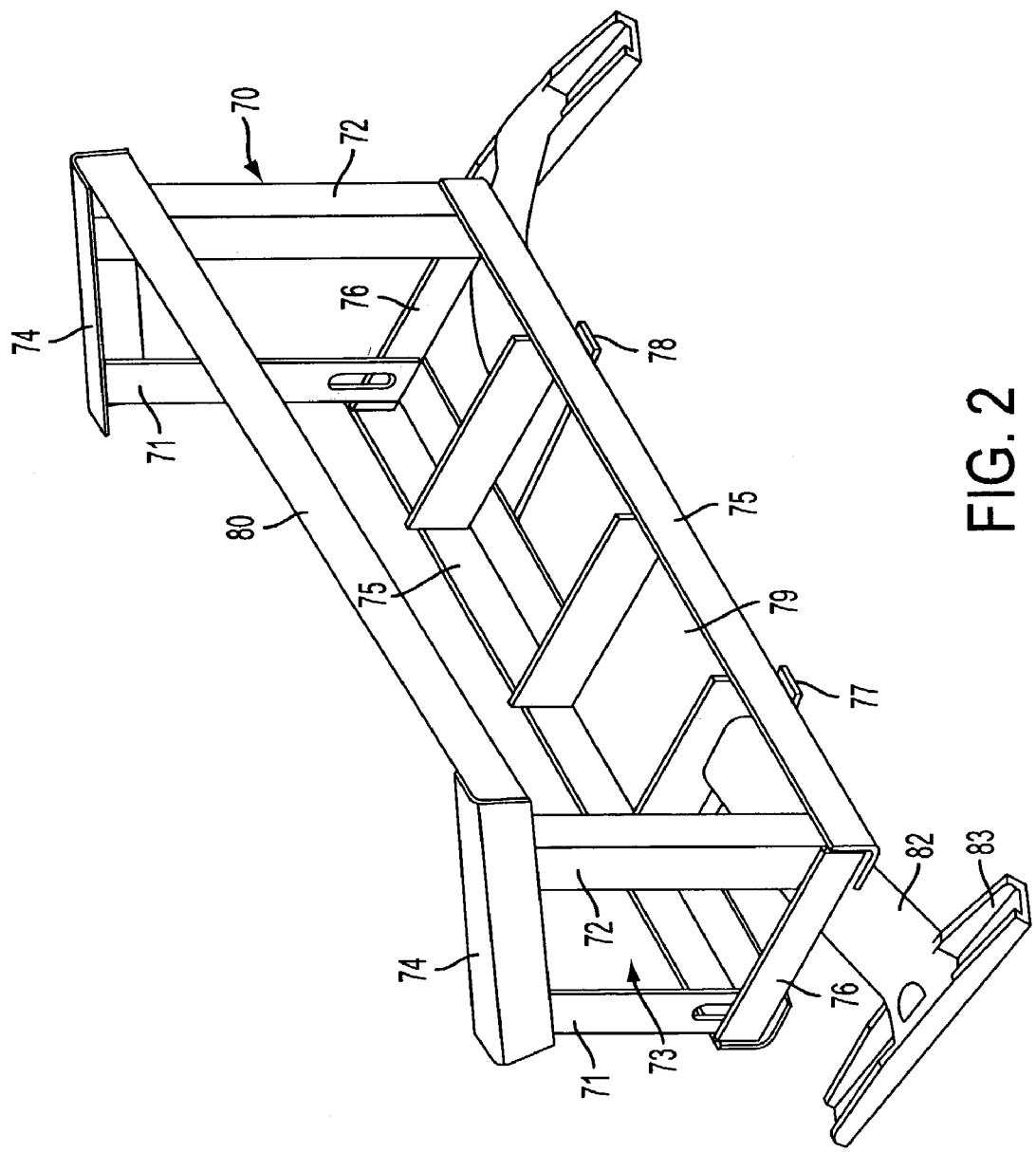
FIG. 2 is a rear perspective view of a frame for mounting components of the modular HVAC system shown in FIG. 1.
Figure 3:
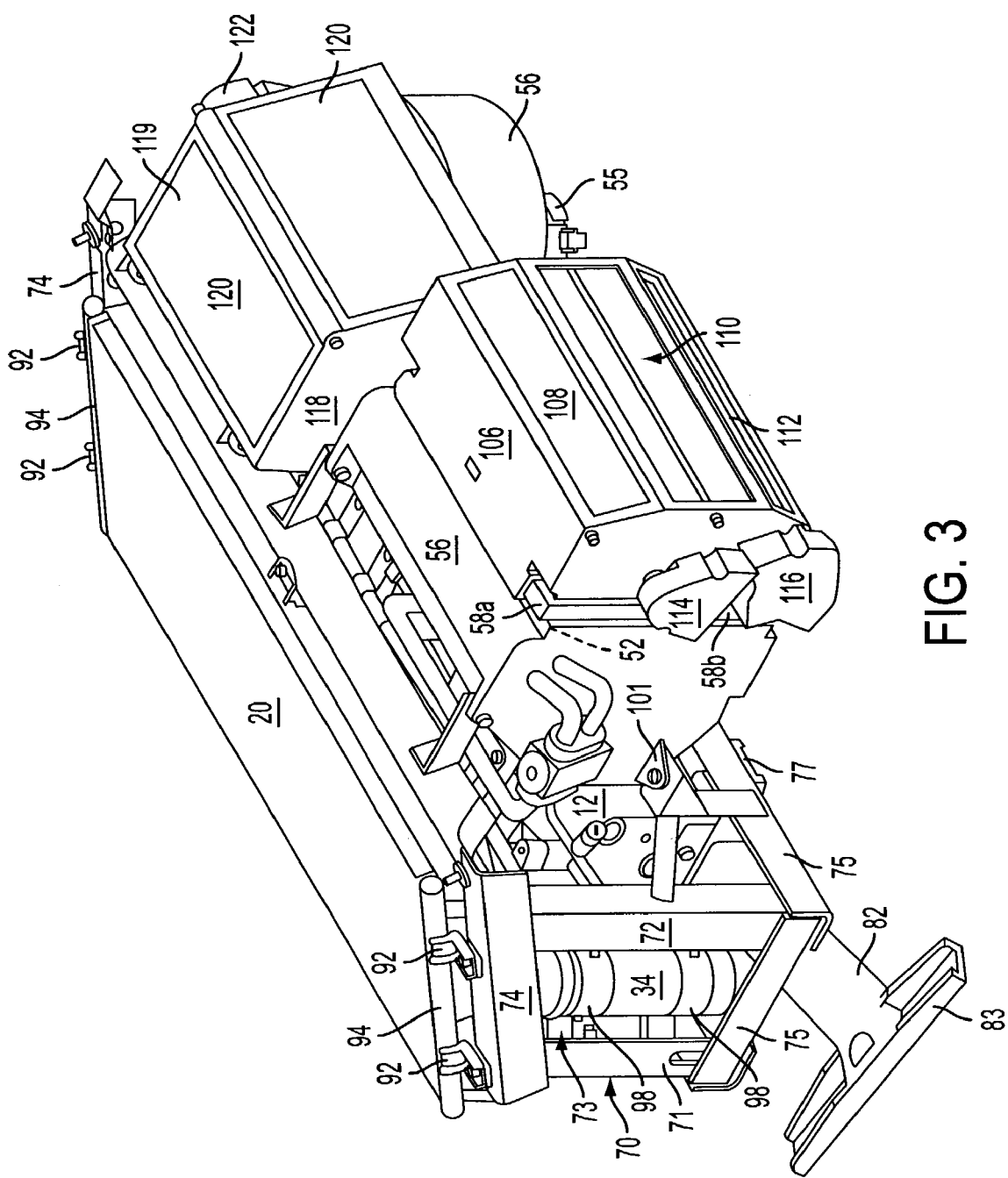
FIG. 3 is a rear perspective view of the modular HVAC system of FIG. 1 mounted on the frame of FIG. 2.

Referring now to FIGS. 2–9 where a preferred embodiment of the modular HVAC system 10 is shown, it is seen that each of the components of FIG. 1 are either mounted within, or attached directly or indirectly to a frame 70 shown in FIG. 2. By having the HVAC components mounted on the frame 70, installation of a vehicle's HVAC system is facilitated because substantially the entire modular HVAC system 10 is mounted directly on a vehicle chassis and made operational by plugging into the electrical power supply of the vehicle. Assembly time and complexity are therefore substantially reduced and the system is readily removable for service by dealers and mechanics.

As is best seen in FIG. 2, the frame 70 includes front and rear vertical struts 71 and 72, respectively, separated by gaps and disposed on opposite sides of the frame to define a space 73 within the frame. The rear vertical struts 72 are higher than the front vertical struts 71 with the top ends of the struts of each pair being connected by inclined beams 74 that are L-shaped in cross section. Extending between the bottom ends of the vertical struts 71 and 72 in a direction across the vehicle in which the frame 70 is to be mounted are two cross braces 75 that cooperate to define the lateral width of the frame 70. In order to stiffen the frame 70, stiffeners 76, 77 and 78 extend between the cross braces 75. A support pan 79 for the compressor 12 and compressor motor 14 is disposed over the stiffener 77 and a lateral support 80 extends between the cross braces 75 at the upper ends of vertical supports 72. The rigid frame 70 of FIG. 2 is attached to a chassis of an automotive vehicle by support struts 82 having feet 83 that are bolted or welded to the chassis, preferably after the components shown in FIG. 1 are assembled within or on the frame 70, as is shown in FIGS. 3–9.

Referring now more specifically to FIGS. 3–9, it is seen that the compressor 12 and integral electric motor 14 are mounted on the rectangular support pan 79 within the space 73 enclosed by the frame 70. Compressor 12 is connected through a metal pipe 18 (FIG. 1) to the condenser 20 which is fastened by clamps 92 on the L-shaped beams 74, which clamps grip support rods 94 of the condenser 20 at opposite ends of the condenser. The fans 26 and 28 (FIG. 1) are mounted in the rectangular frame 70 beneath the condenser 20 to draw air through the condenser from a condenser intake duct 96 (FIGS. 4 and 5) that extends upwardly from the condenser in fluid connection with outside air through an opening 97. The fans 26 and 28 draw air though the condenser intake duct 96 and into the space 73 defined by the frame 70.

Liquid refrigerant condensed in the condenser flows through the pipe 32 (FIG. 1) to the receiver 34 that separates liquid refrigerant from gas refrigerant. The receiver 34 is supported within the space 73 by straps 98 (see FIG. 3). From the receiver 34, liquid refrigerant flows through pipe 40 to the expansion valve 42 and enters the evaporator 52 through the pipe 50 (see FIG. 1). The evaporator 52 is positioned within the blower duct 56 and is suspended from the top rail 80 by brackets 100 which also support the blower duct 56, as well as being supported by supports 101 attached to the vertical strut 72 and the lateral brace 75 (see FIG. 3).

The evaporator 52 has an outlet side aligned with the PTC heaters 58a and 58b (see FIGS. 1, 6 and 8), which in turn are in fluid communication with an outlet box 106 that is in fluid communication with the heaters and supported by the duct 56. The outlet box 106 has an air conditioning outlet 108, a vent outlet 110 and a heater outlet 112 controlled external controls 114 and 116, which operate vanes within the outlet box 106 to direct air flowing through the evaporator 52 and PTC heaters 58a and 58b according to the desires of an operator within the passenger compartment of the vehicle.

The blower and blower motor 55 are attached to the vertical strut 71 by a bracket 117 (FIG. 7) and is supported on the outside of frame 70 with the blower duct 56 that is connected to an air inlet box 118. The air inlet box 118 has a top opening 119 covered by a screen and/or filter and an air recirculation opening 120 covered by a screen or filter. As determined by an air inlet vane operated a control cam 122, air is selectively drawn through the outside opening 119 or through the recirculation opening 120 in fluid communication with the passenger compartment of the vehicle and blown by the blower 55 through the blower duct 56. The blown air passes through the evaporator 52 for cooling when the air conditioning system is on and through the PTC heaters 58a and 58b for heating the passenger compartment and/or defrosting the vehicle's windshield when the heating system is on. Optionally the air is blown through both the operating evaporator 52 and the operating PCT heaters 58a, 58b to defrost the windshield 124 (see FIG. 9) of the vehicle as the heated dehumidified air exits outlet 108, or to reduce generally humidity within the vehicle. When both the evaporator 52 and heaters 58a and 58b are turned off, only vent outlet air passes through the vent opening 110 into the vehicle passenger compartment.

Figure 6:
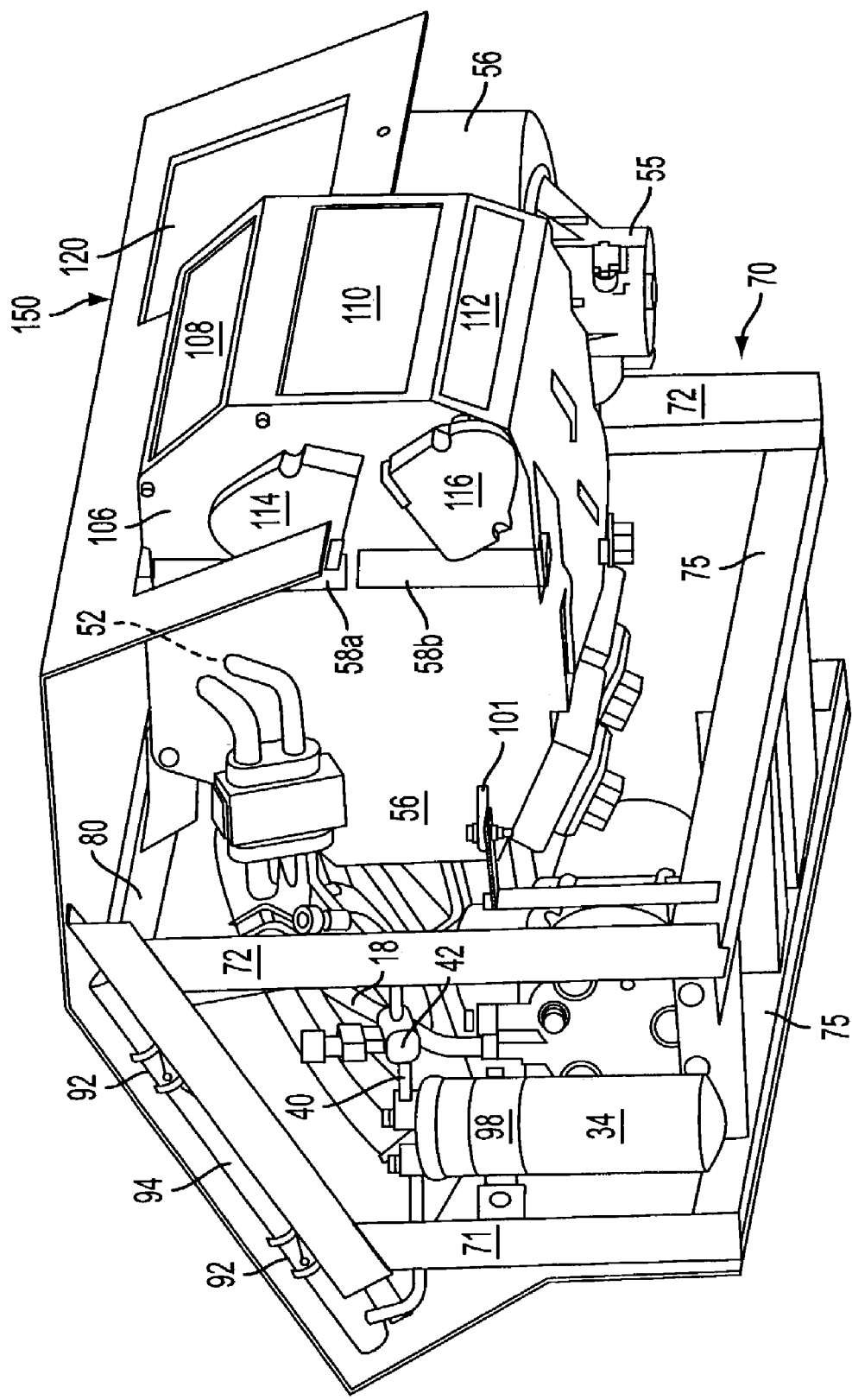
FIG. 6 is a rear perspective view similar to FIG. 3 showing a cover enclosing the HVAC system.
Figure 7:
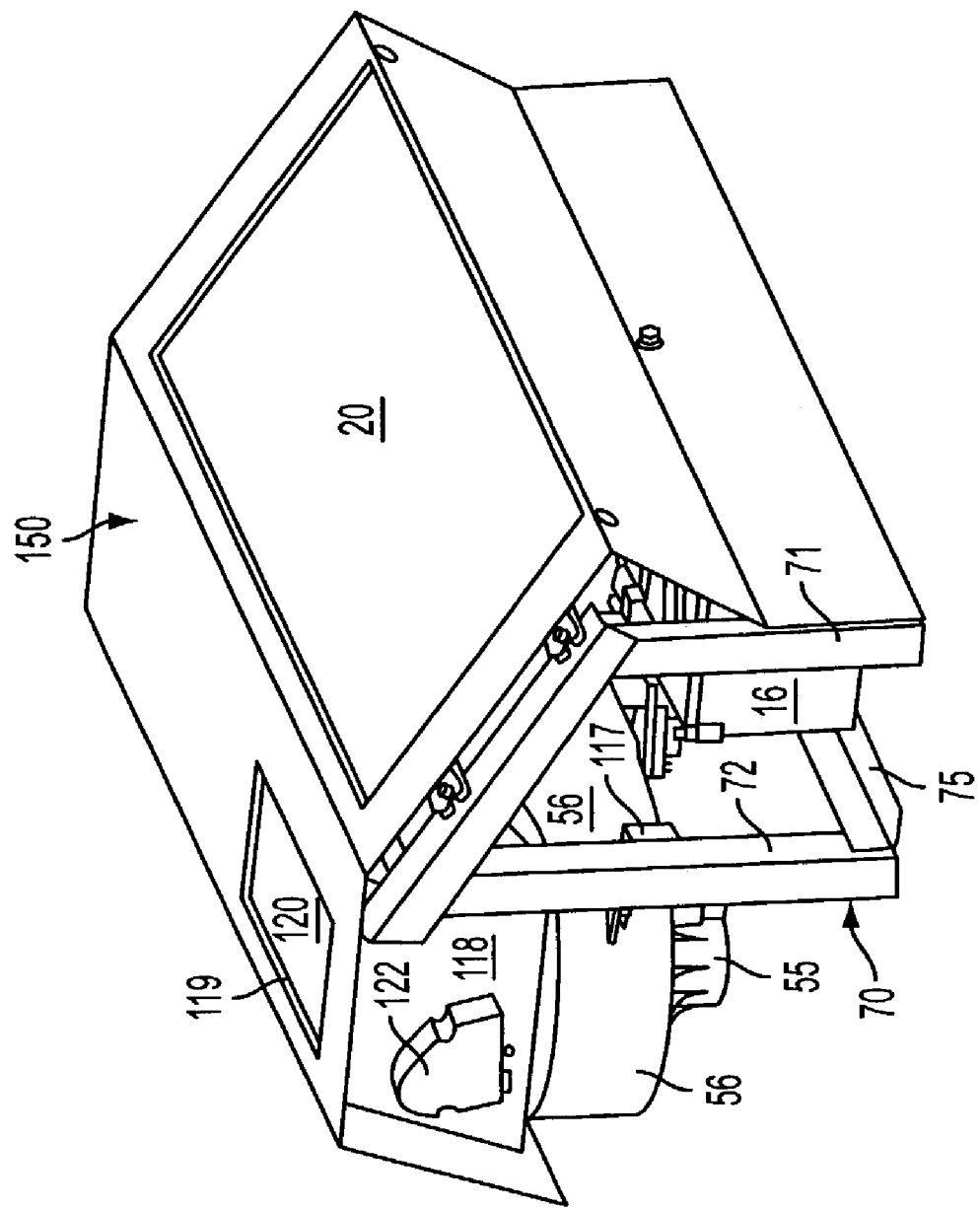
FIG. 7 is a front perspective view of the modular HVAC system showing the cover enclosing the system.
Figure 8:
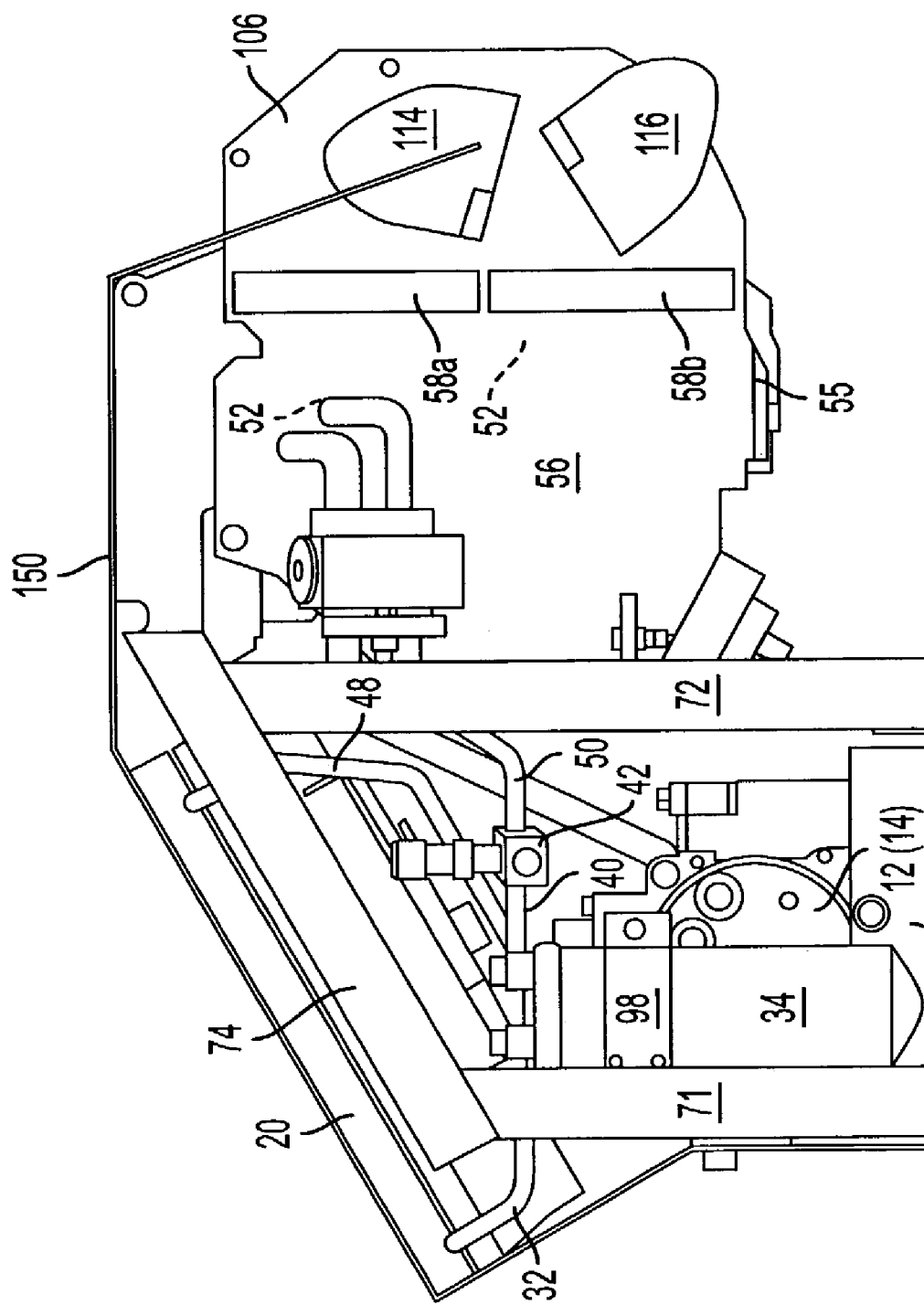
FIG. 8 is a side view of the modular HVAC system.

As is seen in FIGS. 6–8, the modular HVAC system 10 is preferably covered by a cover 150 which fits over the top of the modular system, as well as in front of and behind the modular HVAC system, so that outside air drawn through the condenser 20 by the fans 26 and 28 flows into the space 73 defined by the frame 70 and out through the bottom and sides of the frame.

Figure 9:
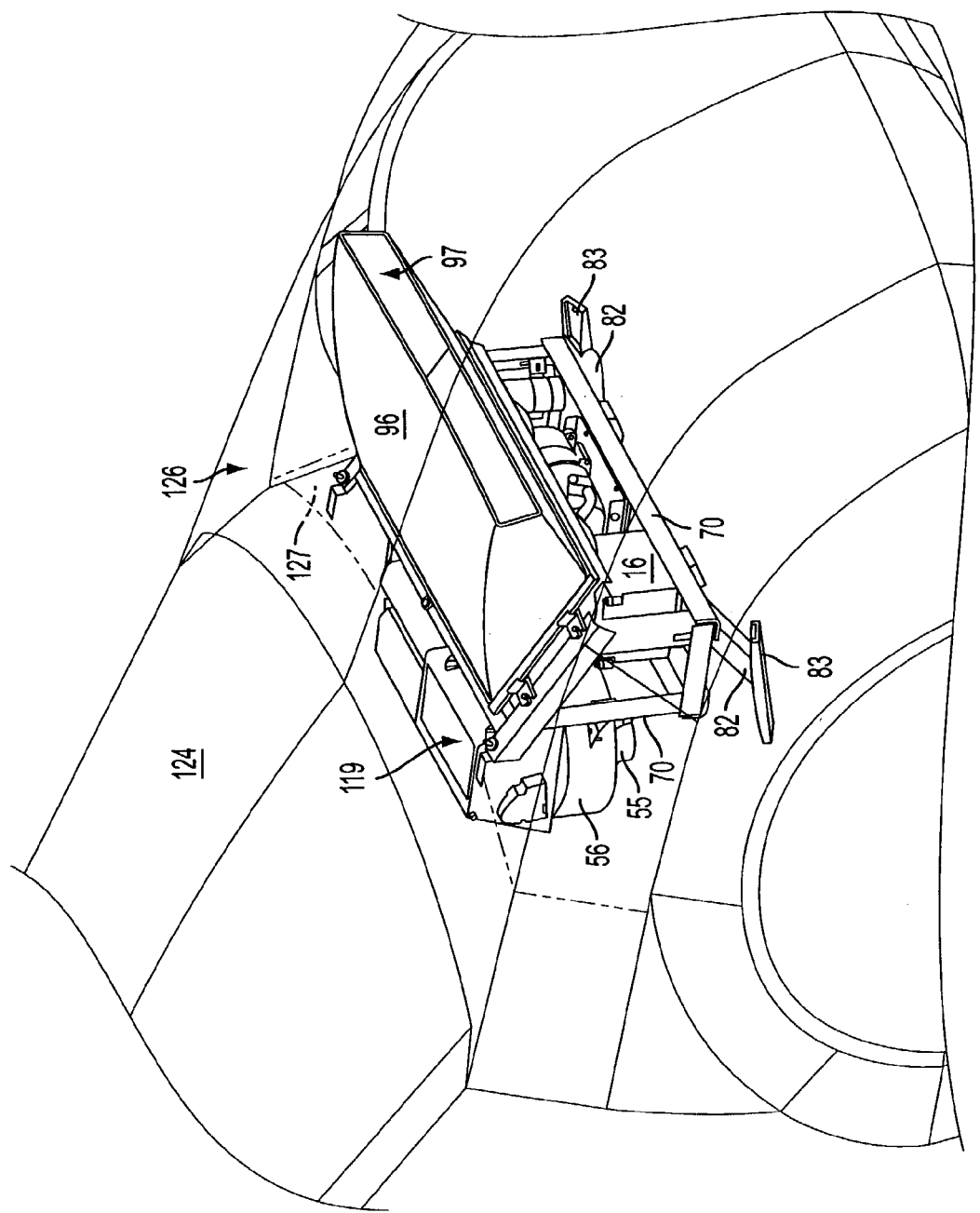
FIG. 9 is a front perspective view showing a portion of a vehicle with the condenser air duct opening through the hood of the vehicle.

Referring now to FIG. 9, when the modular HVAC system 10 of FIGS. 2–8 is mounted on the chassis of a vehicle 126, such as a hybrid or fuel cell vehicle, both the inlet air box 118 and the recirculation opening 120 of the inlet box will project through a dash 127 (in dotted lines) near the front of the vehicle.

While the modular HVAC system 10 is shown mounted on the front of the vehicle 126 in FIG. 9, a system similarly configured may be mounted at the rear of the vehicle with the defroster outlet, vent outlet and heater outlets 110, 112 and 114 (FIGS. 3 and 4), respectively, being ducted towards the front of the vehicle. With such an arrangement heated or cooled air is conveyed both toward the front of a vehicle's passenger compartment and into the rear of the passenger compartment.

Figure 4:
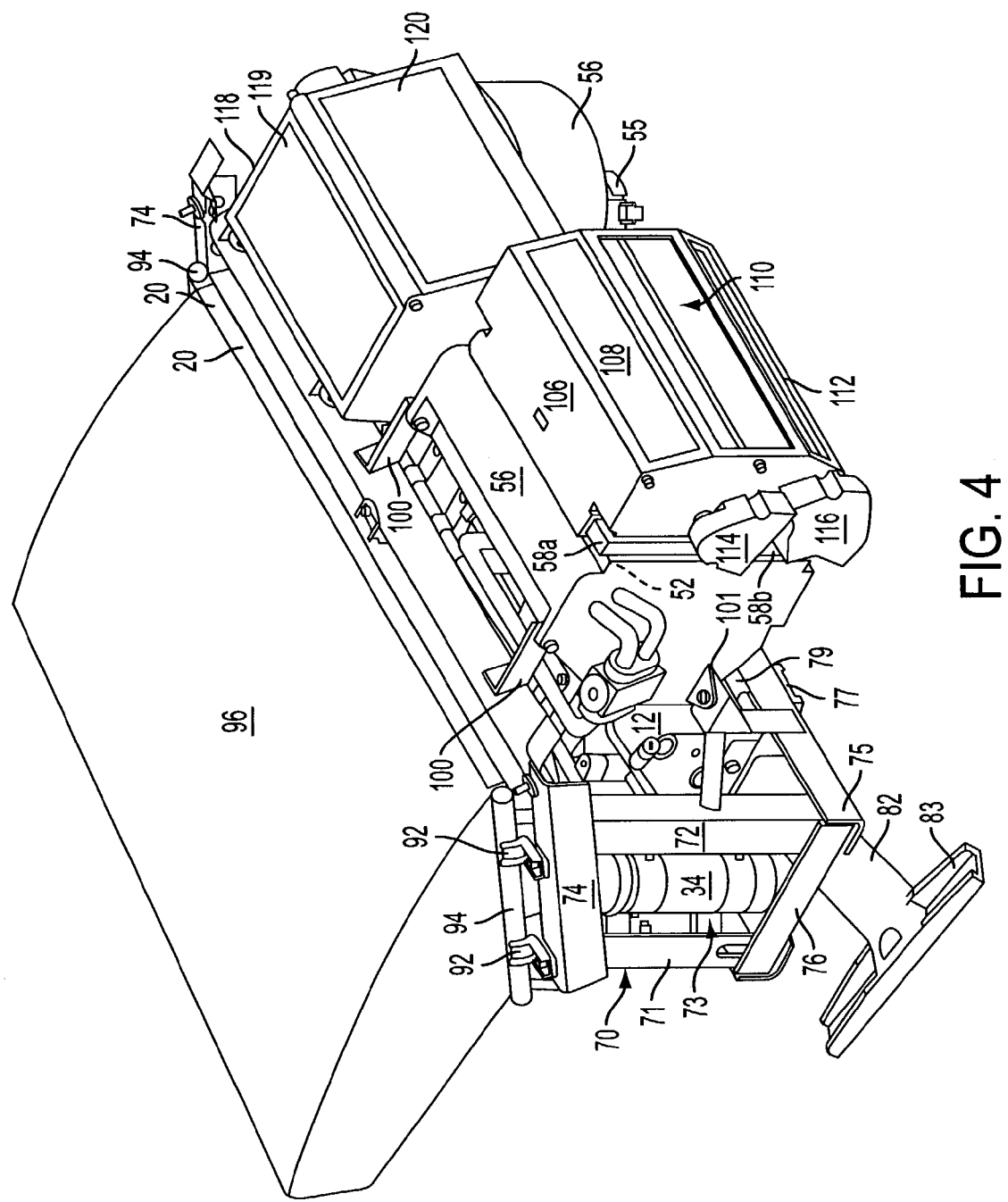
FIG. 4 is a rear perspective view similar to FIG. 3 including a condenser air intake duct attached to the modular HVAC system.
Figure 5:
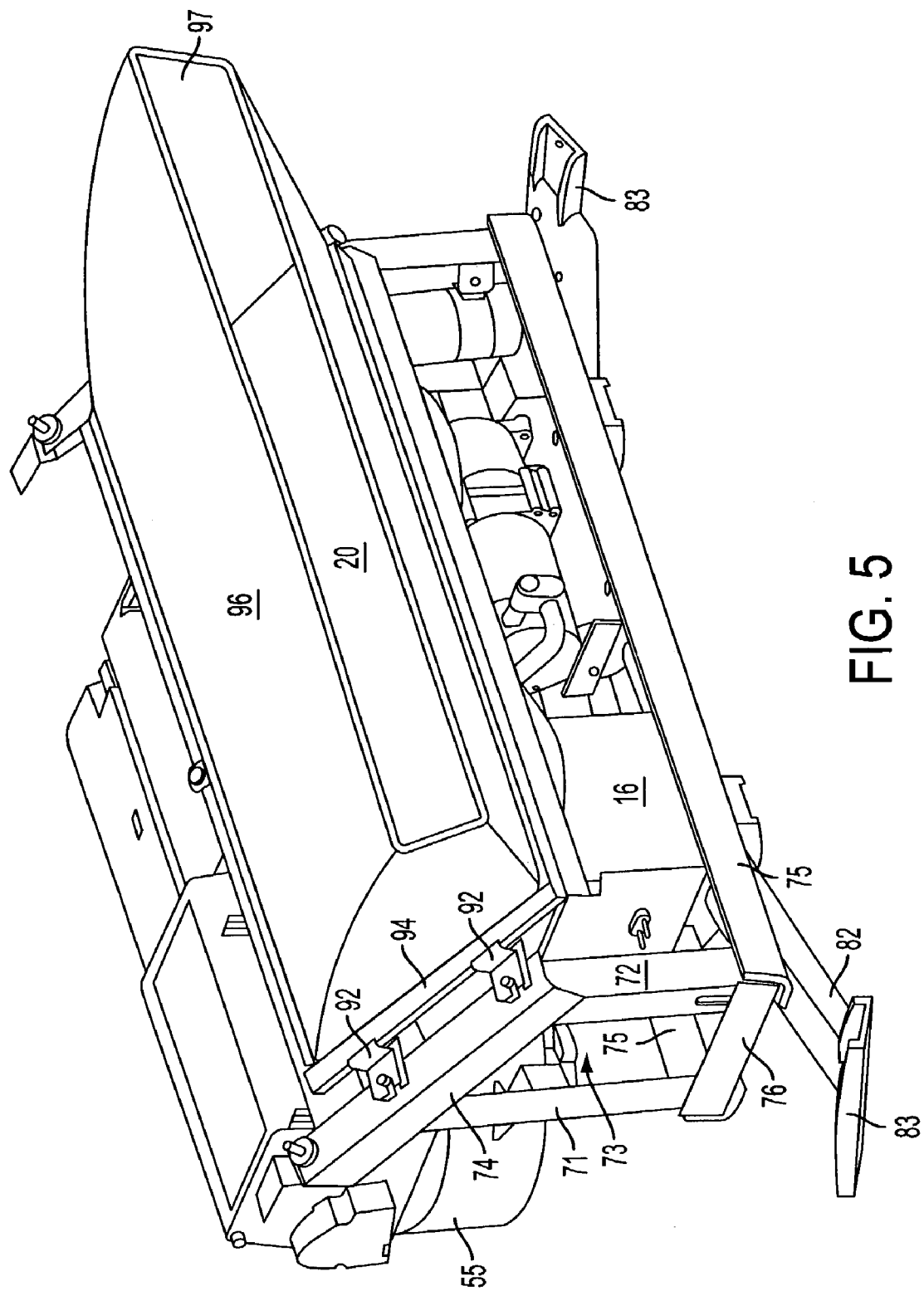
FIG. 5 is a front perspective view of the modular HVAC system of FIG. 1 mounted on the frame of FIG. 2 with the condenser intake duct attached to the modular HVAC system.

In alternative arrangements for the modular HVAC 10, the frame 70 can be configured as a rectangular box with the condenser 20 mounted horizontally, as opposed to being canted in the manner of the condenser 20 of FIG. 4. The condenser 20 can also be mounted to extend vertically and can mount directly on the frame 70 or be mounted in spaced relation with respect to other air conditioning components. For example, the condenser 20 may be mounted in the front of the automotive vehicle with the other HVAC components, i.e. the compressor 12, receiver 34, evaporator 52 and heater 58 mounted adjacent the dash 127 (FIG. 9). In an embodiment where the HVAC system is mounted at the rear of a the vehicle with ducts leading from the outlet box, the condenser 20 can mount directly on the frame 70 or be displaced from the frame and the other air conditioning components.

Figure 10:
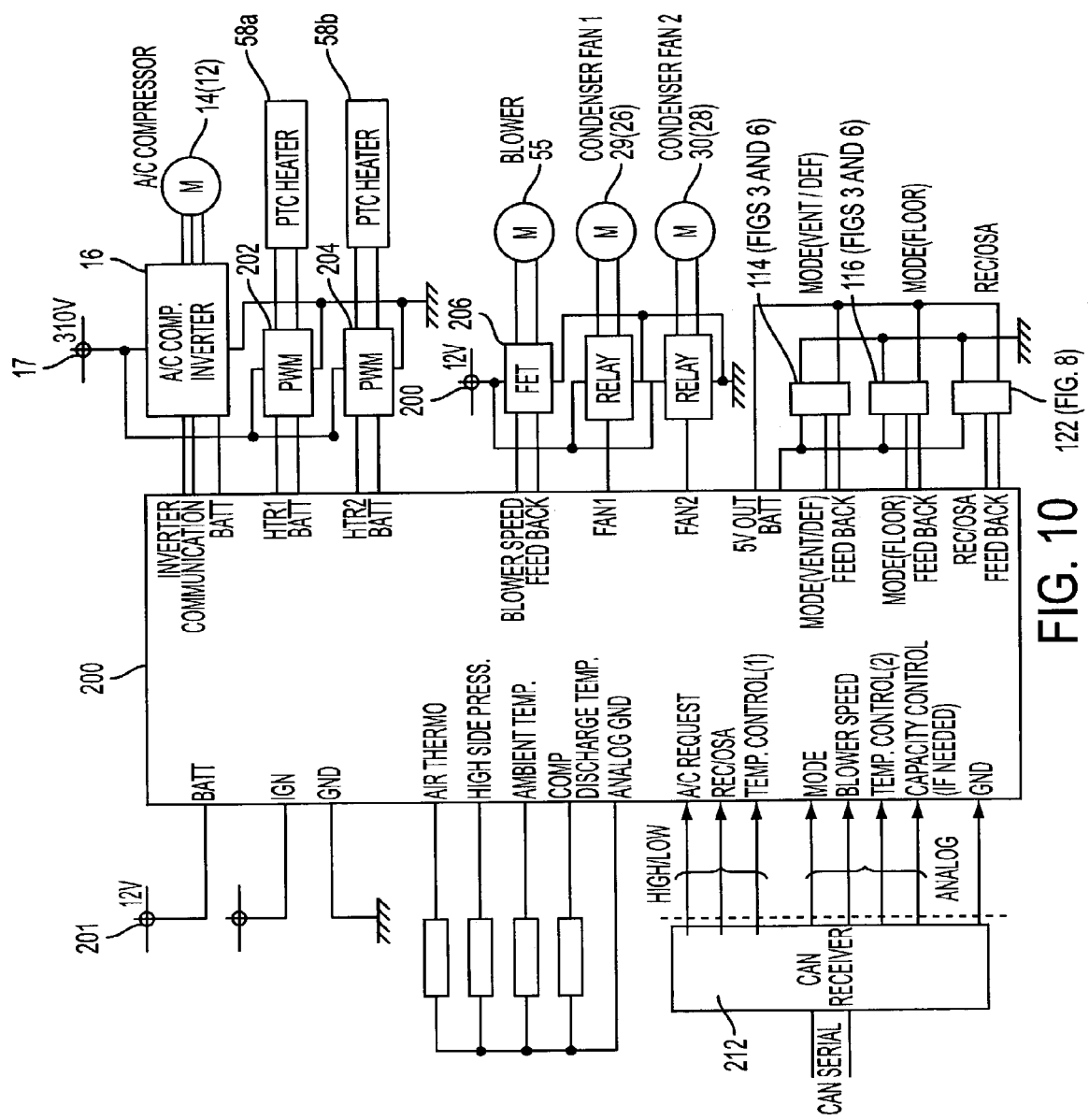
FIG. 10 is a schematic diagram of an electrical system for powering and controlling the modular HVAC system of FIGS. 1–5.

Referring now to FIG. 10 where a schematic diagram for the electrical system is illustrated, an interface bus 200 is connected to both the 310-volt dc power supply 17 and a 12-volt dc power supply 201. The air conditioning compressor inverter 16 converts the 310-volt dc power from a battery array or fuel cell output to 310-volt ac current, which is used to power the motor 14 that drives the air conditioning compressor 12. The PTC heater 58 which has two heating elements 58a and 58b is also powered directly by the 310-volt dc power supply. Twelve volt battery current from battery terminal 201 is used in controlling application of the 310 volt alternating current from the inverter 16 to the compressor motor 14, and through pulse width modulators 202 and 204, is used in controlling the heaters 58a and 58b, respectively.

The 12 volt dc terminal 201 also powers the motor for the blower 55 and motors 29 and 30 which drive the fans 26 and 28, respectively, with blower speed being determined by a field effect transistor 206, while relays 208 and 210 switch the fan motors 29 and 30 on when the HVAC system is in an air conditioning mode.

The position of the vane inside the air inlet box 118 that is controlled by operator 122 (FIG. 7), and the position of the vanes inside the air outlet box 106 are determined by feedback signals from the interface bus 200 in a known manner.

In accordance with techniques know to those skilled in the art of controlling air within passenger compartments of vehicles, the bus 200 has high and low as well as analog inputs from a common area network receiver 210.

From the foregoing description, one skilled in the art can easily ascertain the essential characteristics of this invention, and without departing form the spirit and scope thereof, can make various changes and modifications of the invention to adapt it to various usages and conditions.

I claim:

1. A modular ventilating, heating and air conditioning system for providing air to a passenger compartment of vehicle comprising:
 a system frame for supporting the ventilating heating and air conditioning system in a modular configuration;
 a hermetic compressor driven by an integral electric motor mounted on the system frame;
 a condenser connected to the compressor and mounted on the system frame;
 a receiver connected to the compressor and mounted on the system frame;
 an evaporator connected to the receiver through an expansion valve and mounted on the system frame;
  a positive temperature coefficient heater attached to the system frame and in fluid communication with the evaporator;
  a blower in fluid communication with an air inlet and the evaporator for blowing air through the evaporator and positive temperature coefficient heater, and
  vent, heat and air conditioning outlets in fluid communication with the evaporator and attached to the system frame for distributing air selectively processed by the positive temperature coefficient heater and evaporator into the passenger compartment.

2. The system of claim 1 wherein the compressor, condenser, receiver, evaporator and expansion valve are connected to one another by metal pipes welded thereto.

3. The system of claim 2 wherein the hermetic air compressor and integral, electric motor are mounted within the system frame.

4. The system of claim 3 further including a condenser air intake duct mounted on the system frame above the condenser for directing outside air through the condenser.

5. The system of claim 4 wherein the condenser has fans associated therewith, the fans being disposed within the system frame for drawing outside air through the air intake duct and into and through the condenser.

6. The system of claim 5 further including an inverter disposed within the system frame and connected to the electric motor for converting direct battery current to alternating current for powering the electric motor to drive the compressor.

7. The system of claim 6 wherein the inverter converts 12 volt direct current to substantially 310 volt alternating current.

8. The system of claim 1 further including an inverter disposed within the system frame and connected to the electric motor for converting direct battery current to alternating current for powering the electric motor to drive the compressor.

9. The system of claim 8 wherein the inverter converts 12 volt direct current to 310 volt alternating current.

10. The system of claim 1 in combination with a dash of the vehicle wherein the vent, heat and air conditioning outlets are integral with a box which projects through an opening in the dash.

11. The system of claim 10 wherein the air inlet is mounted on the system frame and includes an outside air inlet and a recirculation air inlet, the outside air inlet being in fluid communication with an environment outside of the vehicle and the recirculation inlet being in fluid communication with the passenger compartment.

12. A modular heating, ventilating and air conditioning system for controlling the environment within the passenger compartment of a hybrid vehicle or fuel cell vehicle, which vehicle has a chassis and is driven by a direct electric current source, the system comprising:

a system frame for supporting the ventilating, heating and air conditioning system in a modular configuration an the chassis of the vehicle;

a hermetic compressor powered by an electric motor for compressing a refrigerant gas, the hermetic compressor having a metal refrigerant intake line and a metal refrigerant discharge line for conveying hot compressed refrigerant gas, the compressor and motor being mounted within the system frame;

a condenser coupled to the metal discharge line of the compressor for receiving the compressed hot refrigerant gas therefrom, the condenser cooling the compressed hot refrigerant gas to condense the gas to a liquid, the condenser having a metal outlet line coupled to a receiver which separates gas from the liquid; the condenser being mounted on the system frame and the receiver being mounted within the system frame and having a metal outlet line;

an evaporator coupled to the metal outlet line of the receiver through an expansion valve, the evaporator being mounted on the system frame;

a ceramic electric heater mounted proximate the evaporator and in fluid communication therewith, the ceramic heater being powered by the same direct current source that drives the vehicle;

a blower mounted on the system frame in fluid communication with the evaporator and ceramic heater;

an air inlet box mounted on the system frame and connected directly to the blower, the air inlet box having an outside air intake opening outside the vehicle for providing outside air to the blower and a recirculation air intake opening within the interior of the vehicle for providing recirculated air to the blower, and an air outlet box mounted on the system frame in fluid communication with the blower through the evaporator and ceramic heater, the outlet box having a defroster outlet, a vent outlet and a heater outlet.

13. The modular system of claim 12 wherein a condenser intake duct for providing outside air for the condenser is mounted on the system frame with fans for pulling air through the condenser being disposed inboard of the condenser.

14. The modular system of claim 13 wherein the system is in combination with the vehicle and the vehicle has a dash disposed at a front end of the passenger compartment, and wherein the system frame is disposed in front of the dash with the defroster, vent and heat outlets and the recirculation air inlet opening through the dash.

15. The modular system of claim 14 wherein the condenser overlies the compressor and compressor motor with fans for pulling air through the condenser being disposed between the condenser and compressor.

16. The modular system of claim 12 wherein the compressor, condenser, receiver and evaporator are connected to one another by metal pipes having welded couplings.

17. The modular system of claim 12 wherein the source of direct electric current has a voltage of 310 volts.

18. The modular system of claim 12 wherein the system is in combination with the vehicle and wherein the system is mounted on a rear portion of the chassis, the system further including ducts extending from the defroster outlet, vent outlet and heater outlet forward into the passenger compartment.

19. The modular system of claim 12 further including an inverter mounted on the system frame for convening direct electrical current from the direct electric current source to alternating current of substantially the same voltage wherein the electric motor is driven by the alternating current from the inverter.

20. The modular system of claim 19 wherein the condenser overlies the receiver as well the inverter for converting direct current to alternately current for powering the motor for the compressor.

21. The modular system of claim 20 wherein the evaporator, heater, air outlet box and air inlet box are disposed on the system frame adjacent to the dashboard of the vehicle.

* * * * *